United States Patent [19]

Sakata et al.

[11] Patent Number: 4,485,556
[45] Date of Patent: Dec. 4, 1984

[54] MICROMETER GAUGE

[75] Inventors: Hideo Sakata; Ichiro Mizuno; Masao Nakahara, all of Kawasaki, Japan

[73] Assignee: Mitutoyo Mfg. Co., Ltd., Tokyo, Japan

[21] Appl. No.: 372,361

[22] Filed: Apr. 27, 1982

[30] Foreign Application Priority Data

Apr. 30, 1981 [JP] Japan .................................. 56-65704
Jul. 21, 1981 [JP] Japan ................................ 56-114162

[51] Int. Cl.³ .............................................. G01B 3/18
[52] U.S. Cl. .................................... 33/147 G; 33/170; 33/163
[58] Field of Search ............ 33/147 R, 147 F, 147 G, 33/163, 164 R, 164 B, 164 C, 164 D, 166, 170, 165, 159

[56] References Cited

U.S. PATENT DOCUMENTS 672,622  4/1901  Isherwood ............................ 33/165
2,481,078  9/1949  Burwood ............................ 33/147 G

FOREIGN PATENT DOCUMENTS 1000159  3/1956  Fed. Rep. of Germany ... 33/147 G
32462  1/1905  Switzerland ...................... 33/147 G Primary Examiner—Harry N. Haroian
Attorney, Agent, or Firm—Flynn, Thiel, Boutell & Tanis

[57] ABSTRACT

A spindle driving mechanism includes a spiral groove having a comparatively large pitch for transferring a spindle and an engageable portion to be engaged with this spiral groove. The spindle is provided with a rotation preventing device, and an indicator is driven by an axial movement of the spindle.

15 Claims, 9 Drawing Figures

MICROMETER GAUGE

BACKGROUND OF THE INVENTION

1. Field of the Invention

This invention relates to a micrometer gauge or caliper for measuring dimensions of a workpiece to be measured including a length, a thickness and the like through a displacement of a spindle.

2. Description of the Prior Art

Heretofore, there have been developed micrometers of various types. One of the most commonly used ones is a so-called thread micrometer wherein an inner sleeve affixed to a main frame is internally threaded with precision, and external threads formed on a spindle also with precision are threadably coupled to the internal threads thus formed, whereby the spindle is rotated by means of a thimble integrally secured to the spindle to measure a workpiece to be measured. The thread micrometer of the type described can offer the advantages that the micrometer is excellent in dust exclusion because an internal mechanism including the threads is of substantially sealed construction, and, even if an operator releases his hand from the thimble, the spindle is prevented from freely rotating due to a self-locking action of the threads so that the workpiece is secured in its clamped state.

However, on the other hand, the pitch of the threads is generally as minute as about 0.5 mm, and the values of bite between the threads, i.e., the coupled positions of the the threads are varied due to the amount of the force for operating the thimble when the zero point is set or the workpiece is clamped, which results in an unstable measuring accuracy, and consequently, a high skill level is required for the measuring operation.

Since the thread pitch is so minute as described above, it is impossible to move the spindle at high speed, and particularly the measuring efficiency is low in repeated operations. In order to obtain a high speed performance by roughening the pitches of the threads formed on the inner sleeve and the spindle, and moreover, maintain the same level of precision as before, it is necessary that the graduations formed on the peripheral surface of the thimble be made finer than what they were in proportion to the roughened pitches. For example, to read 0.1 mm by use of a commonly used micrometer in which the thread pitch is 0.5 mm, the graduations formed on the peripheral surface of the thimble may be ones obtained by dividing the peripheral surface into fifty equal parts. If the thread pitch is increased by ten times, then the same level of precision cannot be obtained unless the peripheral surface of the thimble is divided into five hundred equal parts. As a result, the high speed performance could not be attained in fact.

No operation at high speed can be attained as described above, and moreover, the spindle is allowed to rotate during measuring operation because the spindle is directly threaded, which results in wrinkles and the like formed on the workpiece which is made of a flexible material such as a soft plastic plate, during the measuring operation. Consequently, the thread micrometer of the type described is not suitable for measuring the workpiece made of such materials as described above, and the thimble also rotates and moves in the axial direction of the spindle during measuring operation. The construction described above is unfit for a micrometer construction to be handled by a single hand. Additionally, there is presented such a disadvantage that precision finishing required for the threads and graduations leads to high costs.

Furthermore, there is encountered with a complicated measuring operation during which the graduation and the vernier formed on an outer sleeve coupled to the inner sleeve and on the thimble, respectively, should be read.

Now, there has been known a so-called linearly movable type micrometer capable of moving the spindle in the axial direction thereof at high speed without allowing the spindle to rotate. However, the conventional linearly movable type micrometer has been constructed such that a control knob formed at a predetermined position relative to the spindle is caused to project to the outside of the main frame, this control knob is operated by a thumb or the like to move the spindle in the axial direction, while a movement value of the spindle is detected and indicated by an indicator or the like driven by a rack and a pinion. In consequence, it is necessary to provide a lock device for the spindle, a snap handle for repeated measuring and a measuring pressure applying device in particular, and moreover, the measured value fluctuates due to the force applied to the control knob, thus preventing reliable measured values.

SUMMARY OF THE INVENTION

The present invention has as its object the provision of a micrometer capable of being operated at high speed, being high in accuracy and not allowing the spindle to rotate.

To achieve the above-described object, the present invention contemplates that a spindle driving mechanism includes a spiral groove having a comparatively large pitch and an engageable portion to be engaged with this spiral groove, so that operation at high speed can be attained, an indicator is adapted to be driven by an axial movement of the spindle separately of the spindle driving mechanism, so that highly accurate measurement can be performed, and the spindle is prevented from rotating by spindle rotation preventing means.

DESCRIPTION OF THE PREFERRED EMBODIMENTS

Figure 1:
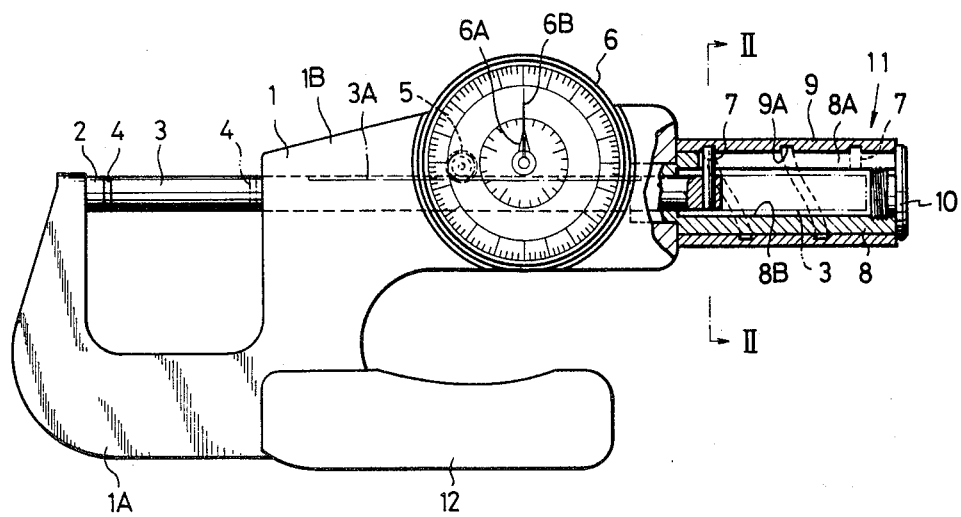
FIG. 1 is a front view, partially cut away, showing the general arrangement of a first embodiment of the micrometer according to the present invention.
Figure 2:
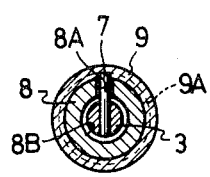
FIG. 2 is a sectional view in the direction indicated by the arrows from line II—II in FIG. 1.

FIG. 1 shows the general arrangement of the first embodiment of the present invention. In this drawing, one end of a main frame 1 is formed into a U-shape, and an anvil 2 is affixed to the inner surface of one end of the opening of this U-shaped portion 1A. The other end of this main frame 1 is rectilinearly extended outwardly from the other end of the opening of the U-shaped portion 1A, and a spindle 3 is slidably inserted through this rectilinear portion 1B in the axial direction thereof. Integrally secured to one end of this spindle 3 is an ultra high hardness tip 4 capable of abutting against the anvil 2 and cuttingly formed on the peripheral surface of the intermediate portion of this spindle 3 is a rack 3A finished with precision over a predetermined range in the axial direction thereof. This rack 3A is meshed with a pinion 5 rotatably supported on the main frame 1, this pinion 5 is connected to a dial gauge 6 serving as an indicator through a gear interlocking mechanism, not shown, and this dial gauge 6 is adapted to be driven by an axial movement of the spindle 3. Additionally, this dial gauge 6 is secured to the rectilinear portion 1B of the main frame 1, and has a large dimension indicating needle 6A and a small dimension indicating needle 6B. The other end of the spindle 3, i.e., the right end in FIG. 1 is projected further rightward than the rectilinear portion 1B, and this projected portion is planted therein with an elongated pin or bar means 7 as being an engageable portion in a partially projected state. The portion of this pin 7 being projected from the spindle 3 is coupled into a slot or aperture 8A of a guide member 8 (Refer to FIG. 2), penetrates through this slot 8A, is further projected, and the forward end of the projected portion is engaged with a spiral groove 9A of cylindrical thimble 9 rotatably supported on the outer periphery of the guide member 8. Here, the pin 7 as being the engageable portion and the guide member 8 constitute spindle rotation preventing means.

One end of the guide member 8, i.e., the left end in FIG. 1 is affixed to the end portion of the rectilinear portion 1B of the main frame 1 by a suitable means such as press fitting, and the other end thereof is threadably coupled thereinto with an inner end of a cap member 10 which serves as a lock against dislodging of the thimble 9. Additionally, the guide member 8 is formed therein with a hole 8B allowing the spindle 3 to linearly move therethrough, the slot 8A is cut in from the right end of the guide member 8 and formed to a position relatively close to the rectilinear portion 1B in a straight line, and the width of the slot 8A is made to snugly coupe the pin 7 in the slot 8a (Refer to FIG. 2), so that the pin 7 can be guided by the slot 8A without looseness.

The spiral groove 9A of the thimble 9 is formed into a thread of a square shape in cross section and having a relatively large pitch, for example, a thread pitch of about 12 mm, whereby the pin 7 being the engageable portion is moved a distance of 12 mm along the spiral groove 9A per full turn of the thimble 9. It is preferable for the spiral groove 9A to have a lead angle of 5° to 18° to obtain a suitable self-lock action. Further, knurling such as lines, twills or the like in pattern is provided on the peripheral surface of the thimble 9, so that the thimble 9 can be easily rotated with no slip of fingers.

Here, the pin 7 being the engageable portion, the guide member 8, the thimble 9 and the cap member 10 constitute a spindle driving mechanism 11. Additionally, projectingly provided at the right side of the lower portion of the U-shaped portion 1A of the main frame 1 is a handle 12 substantially in parallel to the rectilinear portion 1B.

Description will hereunder be given of usage of the first embodiment.

The handle 12 is held by a small finger, a third finger, a middle finger and a palm of the hand, the outer periphery of the thimble 9 is clamped by a thumb and an index finger, and the thimble 9 is rotated in a predetermined direction, i.e., in the counterclockwise direction in looking from the right end in the state shown in FIG. 1. By this, the pin 7 engaged with the spiral groove 9A of the thimble 9 tends to move along the spiral groove 9A. However, since the pin 7 is also coupled into the slot 8A of the guide member 8 affixed to the main frame 1, the pin 7 successively moves rectilinearly to the right in FIG. 1 along with the rotation of the thimble 9. Due to this movement of the pin 7, the spindle 3 moves a distance equal thereto in the same direction. Due to this movement of the spindle 3, the pinion 5 meshed with the reck 3A is rotated commensurate to the movement value. The rotation value of the pinion 5 is imparted to the dial gauge 6 through the gear interlocking mechanism having a known construction, not shown, to be indicated by the needles 6A and 6B as the movement value of the spindle 3. During rotation of this thimble 9, the spindle 3 can move quickly because the spiral groove 9A has the large pitch. When a gap larger that the size of the workpiece, not shown, is formed between the anvil 2 and the ultra high hardness tip 4 due to the rightward movement of the spindle 3 as described above, the workpiece is disposed in this gap, and the thimble 9 is rotated in a direction opposite the direction described above. By this, the spindle 3 is transferred to the left through the actions of the spiral groove 9A of the thimble 9, the pin 7 and the slot 8A, the workpiece is clamped between the anvil 2 and the ultra high hardness tip 4, whereby the size of the workpiece is indicated by the needles 6A and 6B of the dial gauge 6.

The workpiece can be successively measured by repeating the above-described operation.

The first embodiment as described above can offer the following advantages.

Namely, a driving system for the spindle 3 and a driving system for the dial gauge 6 as being the indicator are separated from each other, and the spindle driving mechanism 11 is adapted to quickly drive the pin 7 through the actions of the spiral groove 9A having the comparatively large pitch and the slot 8A, so that the measuring operation can be speeded up. Meanwhile, the dial gauge 6 is driven through the actions of the rack 3A formed on the spindle 3 with precision and the pinion 5, so that the measuring can be achieved with high accuracy. If the spiral groove 9A has a thread pitch of 12 mm for example, the micrometer having a full stroke of 25 mm can achieve the full stroke by a little over two turns of the thimble 9, whereas, with the conventional thread micrometer having a pitch of 0.5 mm, the full stroke cannot be achieved unless the thimble 9 makes 50 turns.

Since the spiral groove 9A has the large thread pitch, measuring errors which would occur with the micrometer of the prior art due to the bite-in of threads can be avoided, so that stable measuring accuracy can be constantly obtained without requiring a high skill level. On the other hand, the spiral groove 9A has self-locking properties, whereby a lock mechanism which would be required in the conventional linearly movable type micrometer having the reciprocating knob or rotary knob is dispensed with, thus enabling simplification the construction of the micrometer and providing the micrometer at low cost. Further, the precision finishing of the rack 3A is facilitated and excellent in handling characteristics to a considerable extent as compared with the finishing of the thread cutting of the conventional pitch of 0.5 mm, so that the micrometer can be provided at low cost as viewed from this respect as well.

Since the spindle 3 itself is moved rectilinearly through the action of the slot 8A of the guide member 8, a soft plastic plate and the like can be readily measured.

Further, the thimble 9 only rotates at one and the same position without axially moving, and the main frame 1 is provided with the handle 12, whereby a so-called one hand operation is facilitated and the degree of freedom of the other hand is not restricted, so that the operating efficiency can be improved.

There is no need for forming a slot or the like in the main frame 1, with the driving mechanism for the dial gauge 6 and the like including the rack 3A, whereby the micrometer according to the present invention has higher air tightness and sealing properties than the conventional one having the reciprocating knob, thereby enabling to improve dust exclusion effect.

Further, the rack 3A of the spindle 3 may receive only a repulsive force as a force driving the needles 6A and 6B of the dial gauge 6, whereby structurally strong construction is not required, so that the micrometer can be provided at low cost.

Description will hereunder be given of embodiments of the present invention other than the preceding first embodiment. Same reference numerals as shown in the first embodiment are used throughout the figures to designate same or similar parts, so that the description will be simplified or omitted.

Figure 3:
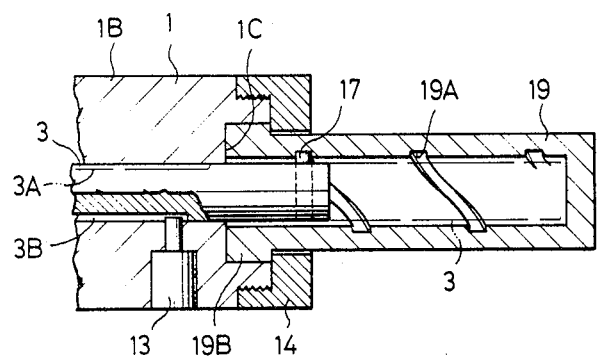
FIGS. 3 and 4 are sectional views enlargedly showing the essential portions of a second and a third embodiment of the present invention, respectively.

FIG. 3 shows a second embodiment of the present invention. In the second embodiment, the guide member 8 shown in the preceding first embodiment is eliminated, and instead, a guide pin 13 being an engageable projection is provided. More specifically, embedded in the rectilinear portion 1B of the main frame 1 is the guide pin 13, the forward end of which is engaged with a guide groove or aperture 3B formed on the peripheral surface of the spindle 3 in the axial direction thereof. This guide pin 13 and guide groove 3B constitute spindle rotation preventing means, so that the spindle 3 can move linearly without rotating. Formed at one end of the thimble 19 is a flange 19B, which is rotatably inserted into a recess 1C formed at an end portion of the rectilinear portion 1B and is locked against dislodging by a nut 14 threadably coupled onto the end portion of the rectilinear portion 1B. Engaged with a spiral groove 19A formed on the inner periphery of this thimble 19 is a pin 17 projectingly provided on the right end of the spindle 3 being an engageable portion.

The second embodiment above-described can also offer the functions and effects similar to the preceding first embodiment that rotation of the thimble 19 can drive the spindle 3 quickly, measurement with high accuracy can be conducted and the like.

Figure 4:
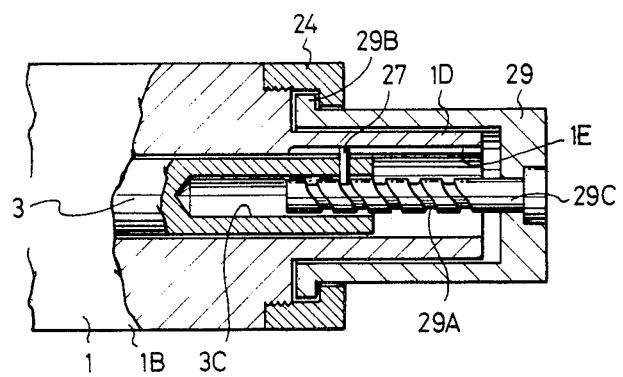

FIG. 4 shows the essential portions of the third embodiment of the present invention. In this drawing, a bottomed cylindrical thimble 29 is rotatably coupled onto a small diameter portion 1D formed on an end portion of the rectilinear portion 1B of the main frame 1, and a flange portion 29B of the thimble 29 is locked against dislodging by a nut 24 threadably coupled onto an end portion of the rectilinear portion 1B. A shaft 29C inwardly projecting into the thimble 29 is formed at the bottom portion of this thimble 29, and a spiral groove 29A is provided on the peripheral surface of the shaft 29C. Additionally, the inner end portion of this shaft 29C may be inserted into a hole 3C formed in the spindle 3, and this hole 3C is formed from the end face of the spindle 3 in the axial direction of the spindle 3 deep enough to receive the total length of the shaft 29C.

Affixed to an end portion of the aforesaid spindle 3 is a pin 27 projecting inwardly from the inner periphery and outwardly from the outer periphery of the spindle 3 as an engageable portion. The end portion of this pin 27 projecting into the hole 3C is engaged with the spiral groove 29A and a portion of the pin 27 outwardly projecting is engaged with a guide groove 1E formed on the inner periphery of the rectilinear portion 1B. By this, the spindle 3 moves rectilinearly along with the rotation of the thimble 29 without rotating.

Also, the third embodiment with the above-described arrangement can offer the advantages that the functions and effects similar to the preceding first and second embodiments are obtainable and working of the spiral groove 29A is facilitated.

Figure 5:
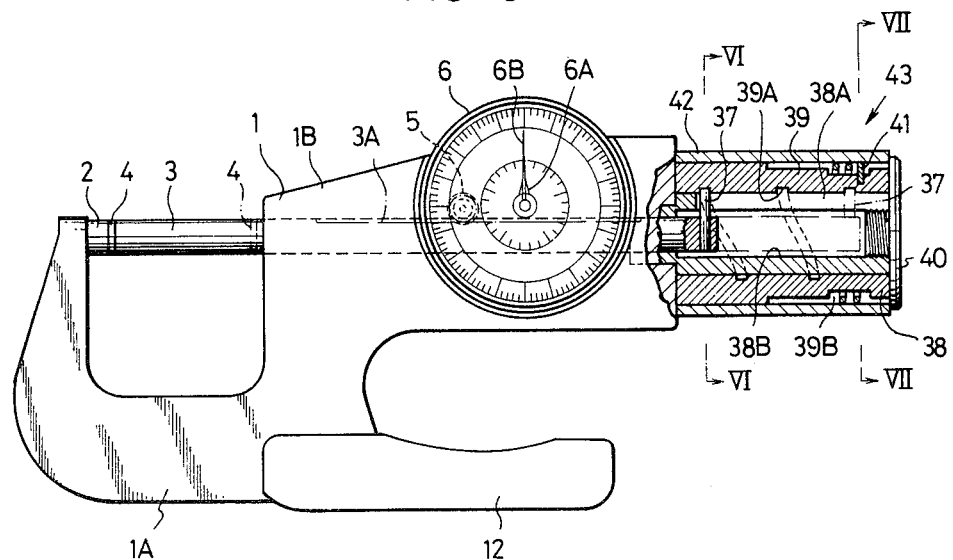
FIG. 5 is a front view, partially cut away, showing the general arrangement of a fourth embodiment.
Figure 6:
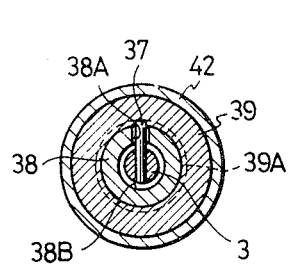
FIGS. 6 and 7 are sectional views in the directions indicated by the arrows from lines VI—VI and VII—VII in FIG. 5.

FIG. 5 shows the general arrangement of the fourth embodiment of the present invention. In the drawing, planted in the vicinity of the right end of the spindle 3 is a pin 37 as an engageable portion in a partially projecting state. The portion of this pin 37 projecting from the spindle 3 is coupled into a slot 38A of a guide member 38, further projects, penetrating through this slot 38A, and the forward end portion thereof is engaged with a left-handed spiral groove 39A of a cylindrical sleeve 39 rotatably supported on the outer periphery of the guide member 38 (Refer to FIG. 6). Here, the pin 37 as being the engageable portion and the guide member 38 constitute spindle rotation preventing means.

One end, i.e., the left end in FIG. 5 of the guide member 38 is affixed to an end portion of the rectilinear portion 1B of the main frame 1 by a suitable means of press fitting, and the other end thereof is threadably coupled thereinto with an inner end of a cap member 40, by which the sleeve 39 and a thimble to be described hereunder are locked against dislodging. Additionally, formed in the guide member 38 is a hole 38B sufficiently large for allowing the spindle 3 to linearly move therein. The slot 38A is cut in from the right end of the guide member 38 and formed in a straight-lined shape to a position comparatively close to the rectilinear portion 1B, and this slot 38A has a width suitable to snugly fit the pin 37 (Refer to FIG. 6), so that the pin 37 can be guided by the slot 38A without looseness.

Figure 7:
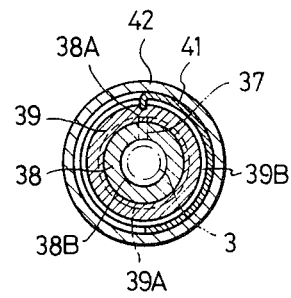

The spiral groove 39A of the sleeve 39 is formed into a thread of a square shape in cross section and having a relatively large pitch, for example, a thread pitch of 12 mm, whereby the pin 37 as being an engageable portion is moved a distance of 12 mm along the spiral groove 39A per full turn of the sleeve 39. Additionally, it is preferable for the spiral groove 39A to have a lead angle of 5° to 18° to obtain a suitable self-lock action. Formed on the outer periphery of the sleeve 39 over the total circumferential length thereof is a guide recess 39B, around which a right-handed coil spring 41 is wound. One end of this coil spring 41 is affixed to the right side of the bottom portion of the guide recess 39B as shown in FIG. 5, the outer end thereof remains free without being secured, and the outer periphery of this coil spring 41 is in pressing engagement with an inner periphery of a cylindrical thimble 42 rotatably supported on the outer periphery of the sleeve 39 (Refer to FIG. 7). Due to this pressing engagement, a frictional force is generated between the inner periphery of the thimble 42 and the outer periphery of the coil spring 41, and, as the thimble 42 rotates, the rotation is imparted to the sleeve 39 through this frictional force, whereby the sleeve 39 is rotated. These coil spring 41 and thimble 42 constitute constant pressing means. Further, knurling such as lines, twills or the like in pattern is provided on the peripheral surface of the thimble 42, so that the thimble 42 can be easily rotated with no slip of fingers.

Here, the pin 37 being the engageable portion, the guide member 38, the sleeve 39, the cap member 40 and the constant pressing means constitute a spindle driving mechanism 43.

Description will hereunder be given of operation of the fourth embodiment.

If it is desired to turn the thimble 42 in a predetermined direction, i.e., the counterclockwise direction in looking from the right end as illustrated in FIG. 5, then a frictional force is generated between the inner periphery of the thimble 42 and the outer periphery of the right-handed coil spring 41 being in pressing engagement with the inner periphery of this thimble 42. This frictional resisting force is imparted to the sleeve 39 through the coil spring 41, whereby this sleeve 39 tends to rotate leftwardly. Since one end of the coil spring 41 is not secured in this case, the frictional resisting force acts on this right-handed coil spring 41 in a manner to twist the outer periphery of the coil spring 41 leftwardly, whereby the coil spring 41 tends to be enlarged in diameter. Consequently, the force pressing this coil spring 41 against the thimble 42 abruptly increases, with the result that the frictional resisting force also increases, whereby the thimble 42 and the coil spring 41 are brought into a state similar to a locked state, so that the inner periphery of the thimble 42 and the coil spring 41 are interlocked for rotation with no slips.

If it is desired to rotate the sleeve 39 leftwardly as described above, then the pin 37 engaged with the spiral groove 39A of the sleeve 39 tends to move along the spiral groove 39A. However, the pin 37 is also coupled into the slot 38A of the guide member 38 solidly secured to the main frame 1, whereby the pin 37 is rectilinearly and successively moved to the right in FIG. 5 along with the rotation of the sleeve 39. Due to this movement of the pin 37, the spindle 3 is transferred in the same direction by the same value.

When a gap larger than the size of the workpiece, not shown, is formed between the anvil 2 and the ultra high hardness tip 4 by the rightward movement of the spindle 3 as described above, the workpiece is disposed in this gap, and the thimble 42 is rotated in a direction opposite the above, i.e., rightwardly. By this, the rotation of the thimble 42 is imparted to the sleeve 39 through the coil spring 41 by the frictional resisting force generated between the inner periphery of the thimble 42 and the outer periphery of the right-handed coil spring 41 being in pressing engagement with the inner periphery of this thimble 42, whereby the sleeve 39 is rotated rightwardly. Since the frictional resisting force acts on the outer periphery of the right-handed coil spring 41 in a manner to twist the coil spring 41 rightwardly in this case, the coil spring 41 is decreased in its diameter, whereby the pressing contact force between the coil spring 41 and the thimble 42 acts in a direction of being decreased. However, when the spindle 3 is not abutted against the workpiece or the anvil 2, the spindle 3 smoothly moves without any resistance of a large value, whereby the sleeve 39 is also smoothly rotated, so that the coil spring 41 and the thimble 42 can be integrally rotated by a pressing contact force of a preset value.

When the thimble 42 is rotated rightwardly as described above, the spindle 3 is moved leftwardly through the actions of the thimble 42, coil spring 41, the sleeve 39, the spiral groove 39A of the sleeve 39, the pin 37 and the slot 38A, the workpiece is clamped between the anvil 2 and the ultra high hardness tip 4, and the spindle 3 is stopped in movement. If it is desired to further rotate the thimble 42 rightwardly in this condition, a turning moment acting on the thimble 42 is kept increased. When a predetermined turning moment is reached, the coil spring 41 is decreased in its diameter, and finally, the thimble 42 slips on the coil spring 41, so to say, the thimble 42 assumes an idle position. In consequence, the turning moment imparted to the spindle 3 comes to be restricted, whereby a force of the spindle 3 abutting against the workpiece, i.e., a measuring force is restricted to a predetermined value, so that the workpiece can be clamped between the anvil 2 and the ultra high hardness tip 4 of the spindle 3 under a predetermined constantly pressing force.

In the state of the workpiece being clamped under the predetermined measuring force as described above, the size of this workpiece is read by means of the needles 6A and 6B of the dial gauge 6, so that the measured value can be obtained.

The workpiece can be successively measured by repeating the above-described operation.

The fourth embodiment with the above-described arrangement can offer the following advantages in addition to the effects similar to the effects of the preceding first through third embodiments.

Namely, the driving system is divided into two parts including a system for driving the spindle 3 and another system for driving the dial gauge 6, and the spindle driving mechanism 43 includes the constant pressing means capable of making the measuring force of the spindle 3 to be constant through the actions of the coil spring 41 affixed only at one end thereof to the sleeve 39 and the thimble 42, so that the workpiece can be clamped for measuring between the spindle 3 and the anvil 2 under a constant measuring force. In consequence, variations rarely occur in measuring values, so that the measuring accuracy can be stabilized. In order to clamp the workpiece under the constant measuring force, it suffices that the thimble 42 is caused to make several turns rightwardly, and no skill level is required in operation, so that measuring with stabilized accuracy can be conducted irrespective of the skill level of the operator. Further, ordinarily, the constant measuring force is not set at a value beyond necessity, and moreover, the spindle 3 itself moves rectilinearly through the action of the slot 38A of the guide member 38 to be abutted against the workpiece, so that the workpieces which tend to be easily collapsed, wrinkled or the like, such as the articles high in flexibility including soft plastic and the like, can be readily measured. Since, the workpiece is clamped between the anvil 2 and the spindle 3 under a constant measuring force, the value of deflection generated in the main frame 1 becomes constant, and consequently, variations in the measured values can be eliminated in this respect, so that the measuring accuracy can be stabilized. The force acting on the main frame 1 as a reaction force is constant for a reason similar to the above, and no excessive reaction force acts thereon, whereby the main frame 1 is not subjected to permanent deformation and the like, so that decrease in measuring accuracy can be effectively prevented. In the case of rightwardly rotating the thimble 42 to clamp the workpiece between the anvil 2 and the spindle 3, if the spindle 3 is to be abruptly abutted against the workpiece, a slip occurs between the thimble 42 and the coil spring 41, whereby a turning moment exceeding a predetermined value is not imparted to the sleeve 39, so that an impact load can be effectively prevented from occurring at the engaged portion between the pin 37 as the engageable portion and the spiral groove 39A. In consequence, durability of the spindle driving mechanism 43 can be improved.

Figure 8:
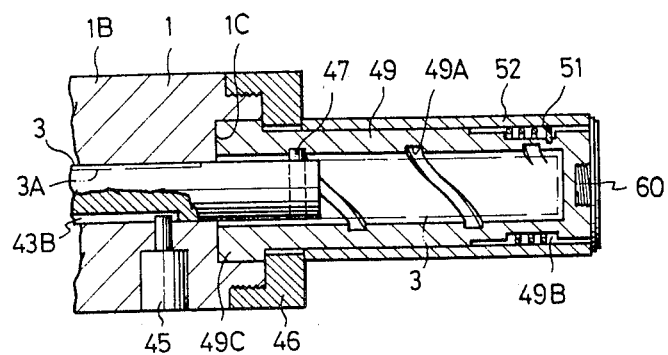
FIGS. 8 and 9 are sectional views enlargedly showing the essential portions of a fifth and a sixth embodiment, respectively.

FIG. 8 shows the essential portions of the fifth embodiment of the present invention. In this fifth embodiment, the guide member 38 in the preceding fourth embodiment is removed, and instead, a guide pin 45 being an engageable projection is provided. More specifically, a guide pin 45 is embedded in the rectilinear portion 1B of the main frame 1, and the forward end of this guide pin 45 is engaged with a guide groove 43B formed on the peripheral surface of the spindle 3 in the axial direction thereof. This guide pin 45 and guide groove 43B constitute spindle rotation preventing means, so that the spindle 3 can move rectilinearly without rotating. Formed at one end of the sleeve 49 is a flange 49C, which is rotatably inserted into a recess 1C formed at an end portion of the rectilinear 1B and is locked against dislodging by a nut 46 threadably coupled into the end portion of the rectilinear portion 1B. A left-handed spiral groove 49A is formed on the inner peripheral surface of the sleeve 49, with which groove a pin 47 projectingly provided as an engageable portion at the right end of the spindle 3 is engaged. A guide recess 49B is formed on the outer periphery of this sleeve 49, the outer periphery of a right-handed coil spring 51 solidly secured at one end thereof to the interior of this guide recess 49B is brought into pressing engagement with the inner periphery of the thimble 52 rotatably coupled onto the outer periphery of the sleeve 49, and a cap member 60 for locking this thimble 52 against dislodging is threadably coupled and affixed to the right end of the sleeve 49.

Also, this fifth embodiment with the above-described arrangement can offer such actions and effects similar to the preceding fourth embodiment that rotation of the thimble 52 can quickly drive the spindle 3, measurement with high accuracy can be conducted, measurement under the constant pressing force can be effected, and the like.

Figure 9:
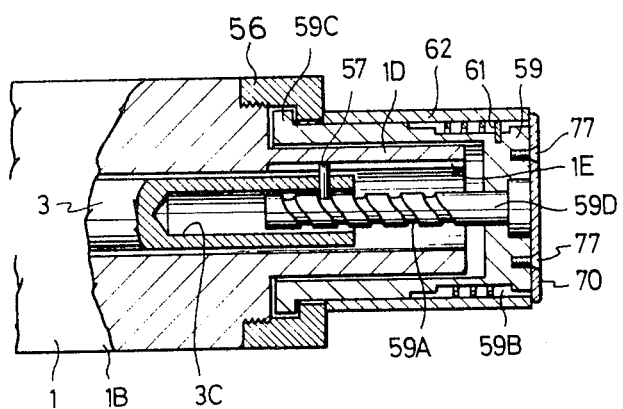

FIG. 9 shows the essential portions of the sixth embodiment of the present invention. In this drawing, a bottomed cylindrical sleeve 59 is rotatably coupled onto a small diameter portion 1D formed at an end portion of the rectilinear portion 1B of the main frame 1, and a flange portion 59C of the sleeve 59 is locked against dislodging by a nut 56 threadably coupled onto the end portion of the rectilinear portion 1B. A guide recess 59B is formed on the outer periphery of this sleeve 59, the outer periphery of a right-handed coil spring 61 solidly secured at one end to the interior of this guide recess 59B is brought into pressing engagement with the inner periphery of a thimble 62 rotatably coupled onto the outer periphery of the sleeve 59, and a cap member 70 for locking this thimble 62 against dislodging is affixed to the right end of the sleeve 59 by means of a countersunk screw 77. A shaft 59D is projectingly provided at the bottom of this sleeve 59 inwardly into the sleeve 59, and a spiral groove 59A is formed on the peripheral surface of this shaft 59D. Additionally, the inner end portion of this shaft 59D may be inserted into the hole 3C formed in the spindle 3, and this hole 3C is formed from the end face of the spindle 3 in the axial direction of the spindle 3 deep enough to receive the total length of the shaft 59D.

Affixed to an end portion of the spindle 3 is a pin 57 projecting inwardly from the inner periphery and outwardly from the outer periphery of the spindle 3 as an engageable portion. The end portion of this pin 57 projecting into the hole 3C is engaged with the spiral groove 59A and a portion of the pin 57 outwardly projecting is engaged with the guide groove 1E formed on the inner periphery of the rectilinear portion 1B. By this, the spindle 3 moves rectilinearly along with the rotation of the sleeve 59 without rotating.

Also, the sixth embodiment with the above-described arrangement can offer the advantages that the functions and effects similar to the ones of the preceding fourth and fifth embodiments are obtainable and working of the spiral groove 59A is facilitated.

In addition, in the second and fifth embodiments, the guide pins 13 and 45 being the engageable projections are provided on the main frame 1 and the guide grooves 3B and 43B are provided on the spindle 3, however, the guide pins 13 and 45 may be provided on the spindle 3 similar to the pins 27 and 57 in the third and sixth embodiments and the guide grooves 3B and 43B may be provided on the main frame 1. Further, one side surface of the spindle 3 is cut away to be flat, a hole snugly fitting the spindle 3 formed thereon with the cut-away portion as aforesaid is formed on the main frame 1 to prevent the spindle 3 from rotating, and the like. Thus, various arrangements of the spindle rotation preventing means are conceivable as described above. Furthermore, in the above-described first through sixth embodiments, the dial gauge 6 is driven by the rack 3A of the spindle 3 to indicate the measured value, however, in working the invention, a rotary encoder may be driven by the rack 3A to indicate by digital type indicator. Further, the means for supporting the sleeve 9, 19, 29, 39, 49 or 59 should not necessarily be limited to the arrangement of each embodiment which may rotatably support the sleeve 9, 19, 29, 39, 49 or 59 on the main frame 1 in a direct or indirect manner. Additionally, in the first and fourth embodiments, the pins 7 or 37 and the slot 8A or 38A may be provided in two or more positions, respectively. Further, in the fourth through sixth embodiments, the guide recess 39B, 49B or 59B is provided on the outer periphery of the sleeve 39, 49 or 59, the coil spring 41, 51 or 61 is affixed in the interior of the recess 39B, 49B or 59B, the outer periphery of the coil spring 41, 51 or 61 is brought into pressing engagement with the inner periphery of the thimble 42, 52 or 62. However, the guide recess 39B, 49B or 59B may be provided on the inner periphery of the thimble 42, 52 or 62, the coil spring 41, 51 or 61 may be affixed to the interior of the recess 39B, 49B or 59B, and the inner periphery of the coil spring 41, 51 or 61 may be brought into pressing engagement with the outer periphery of the sleeve 39, 49 or 59. Furthermore, the guide recess 39B, 49B or 59B should not necessarily be groove-shaped, e.g., may be a stepped portion having a small diameter portion equal in diameter to the guide recess 39B, 49B or 59B. In short, the guide recess may be replaced by any other means which can secure a space, in which the coil spring 39, 49 or 59 may be wound, received and affixed, between the sleeve 39, 49 or 59 and the thimble 42, 52 or 62. Further, this space may be formed on either the outer periphery of the sleeve 39, 49 or 59 or the inner periphery of the thimble 42, 52 or 62, or on both the sleeve and the thimble. The winding directions of the coil spring 41, 51 or 61 and the spiral groove 39A, 49A or 59A may be reversed, respectively. However, in this case, attention must be paid to the fact that, if the thimble 42, 52 or 62 is left-handed, the spindle 3 advances in a direction of abutting the workpiece to be measured, which is an operation opposite to that in the case of the ordinary micrometer. Further, the constant pressing means is constituted by the coil spring 41, 51 or 61 and the thimble 42, 52 or 62. Instead, such an arrangement may be adopted that the thimble 42, 52 or 62 and the guide recess 39B, 49B or 59B are eliminated, the constant pressing means is formed of an independent cylindrical unit constituted by an outer cylinder, an inner cylinder and a coil spring interposed between these cylinders, having a function similar to that of the constant pressing means described in the fourth through sixth embodiments, and the inner periphery of the inner cylinder and the outer periphery of the sleeve 39, 49 or 59 are formed with internal threads and external threads, respectively, so that the both members can be detachably coupled to each other. The above-described arrangement can offer the advantage that the constant pressing means may be readily replaced by a desirable one. Furthermore, the constant pressing means shown in the respective embodiments described above may be replaced by one in which a support member is projectingly provided on the sleeve 39, 49 or 59, and a ratchet stop device, i.e., one-way clutch is provided on the support member in a manner to be aligned with the axial line of the spindle 3. Further, the coil spring 41, 51 or 61 used in the constant pressing means should not necessarily be limited to one formed of a round steel but may be replaced by one formed of a square steel or flat steel, or by a so-called spiral spring extended in the axial direction thereof in such a manner that all wound portions thereof are not overlapped with one another.

As has been described hereinabove, the present invention can provide a micrometer capable of being operated at high speed, which is high in measuring accuracy and prevents the spindle from rotating.

What is claimed is:

1. A micrometer gauge comprising:
   a main frame;
   an elongated spindle mounted on said main frame for axial sliding movement in the lengthwise direction thereof, said spindle having an engageable projection extending radially outwardly therefrom;
   spindle rotation preventing means comprising a non-rotatable slot extending in the lengthwise direction of said spindle, said projection extending through said slot so that rotation of said spindle is prevented;
   a thimble rotatably mounted on said main frame, said thimble having a spiral groove of large pitch on the inner peripheral surface thereof, the radially outermost end of said projection being received in said spiral groove for sliding movement therealong, whereby rotation of said thimble causes lengthwise movement of said spindle with respect to said main frame; and
   an indicator coupled to said spindle and responsive to lengthwise movement of said spindle for indicating a dimension of a workpiece.

2. A micrometer gauge comprising:
   a main frame;
   an elongated spindle mounted on said main frame for axial sliding movement in the lengthwise direction thereof;
   spindle rotation preventing means comprising an engageable member which extends radially relative to said spindle and a slot which extends in the lengthwise direction of said spindle, said member extending into said slot, one of said member and said slot being formed on said spindle and the other thereof being non-rotatably on said main frame, whereby rotation of said spindle is prevented;
   a sleeve rotatably mounted on said main frame, said sleeve having a spiral groove of large pitch on the inner peripheral surface thereof, said spindle having a radially outwardly extending projection thereon, the radially outermost end of said projection being received in said spiral groove for sliding movement therealong so that rotation of said sleeve causes sliding movement of said projection within said spiral groove and lengthwise movement of said spindle with respect to said main frame;
   means for rotating said sleeve by applying force thereto, and for releasing said sleeve from such rotation when the force required to rotate said sleeve exceeds a selected value, which selected value corresponds to a maximum force which can be exerted by an end of said spindle against a workpiece; and
   an indicator coupled to said spindle and responsive to lengthwise movement of said spindle for indicating a dimension of a workpiece.

3. A micrometer gauge as claimed in claim 2, wherein said means for rotating and releasing said sleeve comprises a thimble rotatably mounted on said main frame and encircling said sleeve and a coil spring which is spirally wound around said sleeve and is confined between said sleeve and said thimble, said coil spring having a free end and an end which is affixed to said sleeve, said coil spring being in resilient, pressing contact with the inner periphery of said thimble and the outer periphery of said sleeve, whereby rotation of said thimble causes rotation of said sleeve in the same direction.

4. A micrometer gauge as claimed in claim 3, wherein said coil spring is wound around said sleeve in such a direction that, when said selected force exerted by said spindle will be exceeded, said coil spring will slide along the inner periphery of said thimble, and said sleeve will remain stationary relative to said thimble.

5. A micrometer gauge comprising:
   a main frame;
   an elongated spindle mounted on said main frame for axial sliding movement in the lengthwise direction thereof, said spindle having an axially elongated recess in one end thereof;
   a thimble rotatably mounted on said main frame;
   a shaft connected for integral rotation with said thimble, said shaft extending into said recess of said spindle, said shaft having a spiral groove of large pitch on the outer periphery thereof;
   an engageable projection mounted on said spindle and having a portion received in said spiral groove for sliding movement therealong, means for preventing rotation of said spindle with respect to said main frame, whereby rotation of said thimble causes said projection to slide within said spiral groove and thereby causes lengthwise movement of said spindle with respect to said main frame; and an indicator coupled to said spindle and responsive to lengthwise movement of said spindle for indicating a dimension of a workpiece.

6. A micrometer gauge as claimed in claim 5, further comprising a sleeve rotatably mounted on said main frame, said sleeve being fixedly secured to said shaft, and a coil spring spirally wound around said sleeve which spring is confined between said sleeve and said thimble, said coil spring having a free end thereof and an end which is affixed to said sleeve, said spring being in resilient, pressing contact with the inner periphery of said thimble and the outer periphery of said sleeve, whereby rotation of said thimble causes rotation of said sleeve and said shaft in the same direction.

7. A micrometer gauge as claimed in claim 6, wherein said coil spring is wound around said sleeve such that, when a maximum force exerted by said spindle in the axial direction thereof against a workpiece will be exceeded, said spring will slide along the inner periphery of said thimble, and said sleeve will remain stationary relative to said thimble.

8. A micrometer gauge, comprising:

a main gauge frame having a measuring anvil;

an elongated spindle mounted on said frame for axial sliding movement in the lengthwise direction of said spindle, the front end of said spindle being positioned so as to be axially movable toward and away from said measuring anvil;

spindle rotation preventing means including guide pin means which extends radially relative to the axis of said spindle and an aperture into which an end portion of said guide pin means is fitted, said aperture being elongated in the lengthwise direction of said spindle such that said guide pin means can slide therealong, one of said guide pin means and said aperture being integral with said frame and the other thereof being positioned relative to said spindle such that rotation of said spindle relative to said frame is prevented thereby;

an elongated pin which extends radially relative to the axis of the said spindle, said elongated pin being secured for integral movement with said spindle;

a thimble rotatably mounted on said frame rearwardly of the end of said spindle that is remote from said measuring anvil, means defining a spiral groove of large pitch into which an end of said elongated pin is slidably fitted, said spiral groove being rotatable by said thimble whereby rotation of said thimble causes said elongated pin to slide within said spiral groove, such that said spindle moves in the axial direction thereof; and an indicator mounted on said frame and coupled to said spindle for measuring axial displacement thereof, such that a dimension of a workpiece can be measured by interposing said workpiece between said anvil and said forward end of said spindle, and then rotating said thimble to move said spindle axially towards said anvil to secure said workpiece therebetween.

9. A micrometer gauge as claimed in claim 1, claim 2, claim 5 or claim 8, wherein said spiral groove has a lead angle in the range of from 5° to 18°.

10. A micrometer gauge as claimed in claim 1, claim 2, claim 5 or claim 8, wherein said indicator comprises a dial gauge, a pinion which actuates said dial gauge, and a rack provided on said spindle which meshes with said pinion.

11. A micrometer gauge as claimed in claim 8, wherein said guide pin means comprises the other end of said elongated pin.

12. A micrometer gauge as claimed in claim 8, wherein said guide pin means comprises a guide pin which extends radially inwardly from said frame, and said aperture comprises an elongated guide groove formed on the outer periphery of said spindle in the lengthwise direction thereof forwardly of said thimble and said elongated pin.

13. A micrometer gauge as claimed in claim 8, further comprising a sleeve rotatably mounted on said frame within said thimble, said sleeve having said enlarged spiral groove formed on the inner periphery thereof, whereby rotation of said sleeve results in movement of said spindle in the axial direction thereof, and means for rotating said sleeve by applying force thereto generated by rotation of said thimble and for releasing said sleeve from rotation when the force required to rotate said sleeve exceeds a selected value, which selected value corresponds to a maximum force which can be exerted by the forward end of said spindle against said workpiece.

14. A micrometer gauge as claimed in claim 13, wherein said means for rotating and releasing said sleeve comprises a coil spring which is spirally wound around said sleeve and is confined between said sleeve and said thimble, said coil spring having a free end and an end which is affixed to said sleeve, said spring being in resilient, pressing contact with the inner periphery of said thimble and the outer periphery of said sleeve, whereby rotation of said thimble causes rotation of said sleeve in the same direction, except that when said selected force exerted by said spindle will be exceeded, said coil will slide along the inner periphery of said thimble, and said sleeve will remain stationary relative to said thimble.

15. A micrometer gauge as claimed in claim 8, wherein said spiral groove is substantially square in cross-section, defines a substantially cylindrical helix, and extends for not more than substantially two full turns thereof.

* * * * *